Oct. 17, 1967     H. W. ROESSLER     3,347,570
SWIVEL JOINT AND PACKING THEREFOR
Filed Feb. 27, 1964
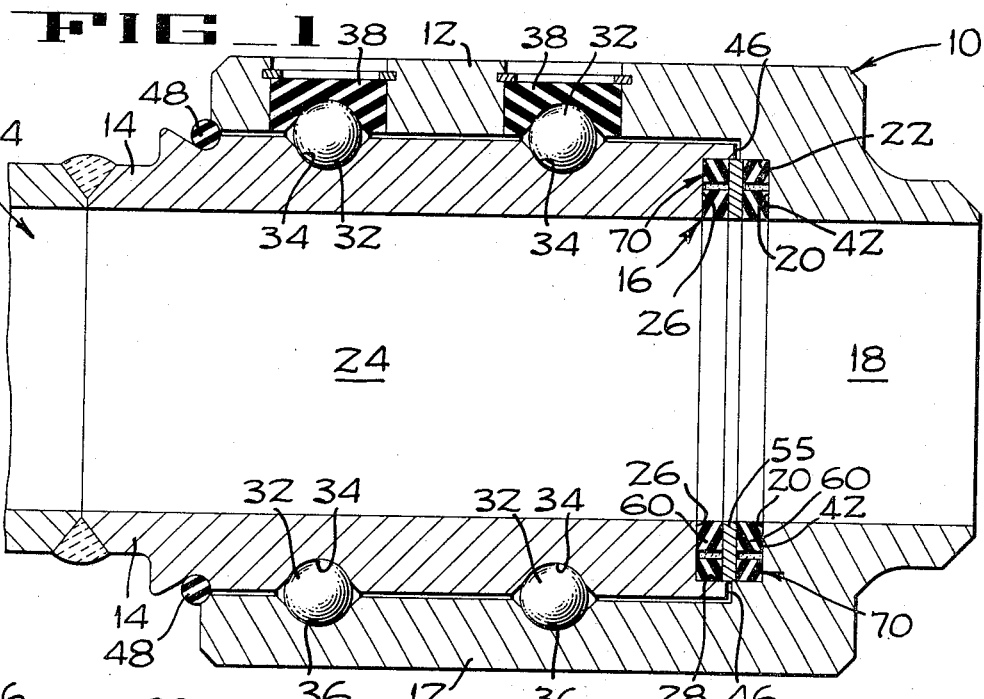
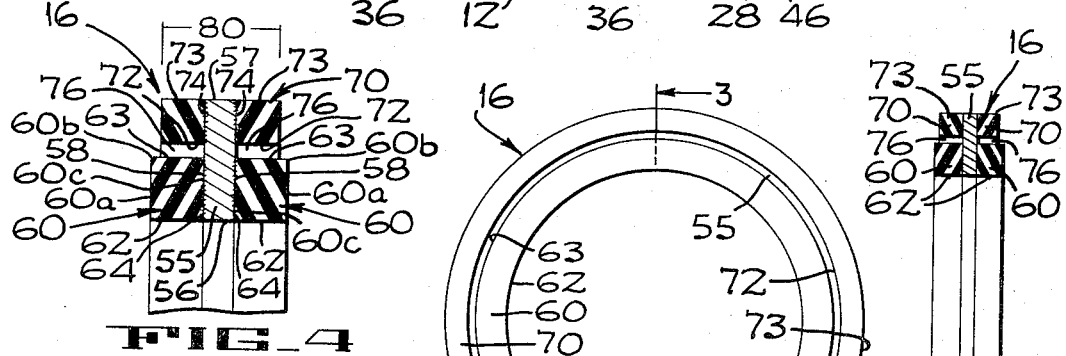
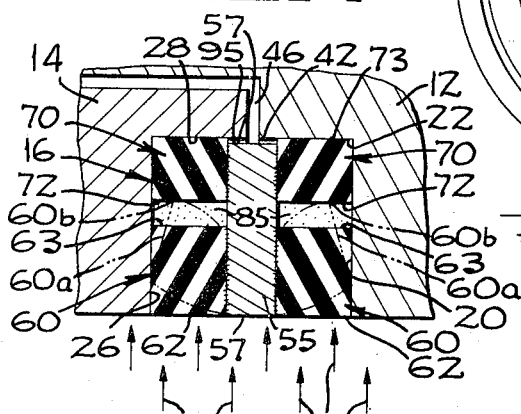
INVENTOR
HENRY W. ROESSLER
BY Hans G. Hoffmeister
ATTORNEY

# United States Patent Office 3,347,570
Patented Oct. 17, 1967

3,347,570
SWIVEL JOINT AND PACKING THEREFOR
Henry W. Roessler, Houston, Tex., assignor to FMC Corporation, San Jose, Calif., a corporation of Delaware
Filed Feb. 27, 1964, Ser. No. 347,920
16 Claims. (Cl. 285—94)

The present invention pertains to a swivel joint and packing therefor and more particularly to a highly durable packing that improves the fluid-tight integrity of a swivel joint while minimizing resistance to swiveling action.

The significance of the present invention will be better understood if brief reference is made to certain background information. A well known packing for a swivel joint includes an annular seal, of resiliently compressible and expandable material, which is positioned in the sealing chamber between two conduits of a swivel joint, and a metallic anti-extrusion ring bonded to a corner of the seal. The anti-extrusion ring referred to is L-shaped in cross-section and relatively thin in its radial and axial dimensions.

Packings of the described type have certain weaknesses which are believed to result in packing failure. First, since the anti-extrusion ring is bonded to just the corner of the seal, all of the bonding stresses are concentrated adjacent to this corner. This unbalanced stress is believed to be a cause of separation between the antiextrusion ring and the seal whereupon the packing fails.

Secondly, to facilitate assembly, the outside diameter of the anti-extrusion ring is usually slightly smaller than the inside diameter of the chamber of the swivel joint which receives the packing. When the packing is subsequently subjected to pulsating internal pressure of the fluid conducted through the joint, the ring is repeatedly stretched, that is forced to expand and contract diametrically. This fatigues the conventional thin ring and results in its breakage.

In addition to problems associated with an anti-extrusion ring, another problem of certain prior art swivel joint packings is the relatively high resistance to swiveling which they impose in order to achieve a satisfactory seal. Stated otherwise, although certain known packings do not exert an undesirably high swiveling torque on a swivel joint, they also do not provide an acceptable seal.

It is an object of the present invention to provide an improved swivel joint and packing therefor.

Another object is to provide a highly durable packing which improves the fluid-tight integrity of a swivel joint while minimizing resistance to swiveling action of the joint.

Asother object is to provide a packing for a swivel joint which can withstand the repeated application of forces which tend to diametrically expand and contact the packing.

Another object is to minimize the concentration of stresses in an elastomeric seal that is bonded to a relatively rigid ring.

Another object is to provide a packing which includes a secondary seal that is energized in response to subjection of a primary seal to fluid pressure and is even further energized upon failure of the primary seal.

Another object is to provide a reversible packing which can be fitted into a swivel joint with either end first.

Another object is to provide a swivel joint including a packing which provides a substantially continuous fluid passage of uniform diameter.

These, together with other objects, will became apparent upon reference to the following description and accompanying drawing in which:

FIG. 1 is a diametric section of a swivel joint, including a packing, and embodying the present invention.

FIG. 2 is a side elevation of the packing shown in FIG. 1.

FIG. 3 is a section taken on line 3—3 in FIG. 2.

FIG. 4 is an enlarged fragmentary section of the subject packing.

FIG. 5 is an enlarged fragmentary section of the swivel joint of FIG. 1 and shows how the packing is affected by internal pressure.

Referring more particularly to the drawing, a swivel pipe joint is generally identified by the numeral 10 and includes a female conduit 12, a male conduit 14 swively connected to the female conduit, and a packing 16 embodying features of the present invention. The female conduit has an axial bore 18, a radial wall 20 projecting outward from the bore, and a cylindrical internal wall 22 projecting axially from the radial wall. The male conduit also has an axial bore 24 coaxial with the bore 18, a radial wall 26 projecting outward from the bore 24, and a cylindrical internal wall 28 projecting axially from the radial wall 26.

The male and female conduits 14 and 12 of the swivel joint 10 are interconnected for relative swiveling movement by balls 32 which are retained in grooves 34 and 36 of the conduit by plugs 38, all as is well known. With the balls in their respective grooves, the radial walls 20 and 26 are in substantially fixed spaced relation to each other. It is to be noted that the internal walls 22 and 28 are of the same diameter and that the internal walls and the radial walls define an annular packing chamber 42 which circumscribes a flow passage 44 that includes the bores 18 and 24. Furthermore, the packing chamber opens into a radial gap 46 between the conduits, this gap constituting the clearance which is required between the conduits to facilitate their relative rotation. An external O-ring 48 circumscribes the male conduit 14 and is in endward engagement with the female conduit 12.

The packing 16 includes a rigid central support ring 55 of metal such as brass. The support ring has a rectangular cross section and includes annular inner and outer edges 56 and 57 and opposite radial surfaces 58. The outside diameter of the ring is slightly less than the inside diameter of the packing chamber 42, whereas the inside diameter of the support ring is substantially the same as the diameter of the flow passage 44.

The packing 16 also includes annular inner seals 60 of resiliently compressible and expandable material such as natural or synthetic rubber. These seals are of uniform size and shape and have a rectangular cross section. Each seal is provided with an inner annular edge 62 of the same diameter as the inner edge 56 of the support ring and an annular outer edge 63 of a diameter less than the outside diameter of the support ring. The inner seals are bonded, as indicated at 64, to the opposite radial surfaces 58 of the support ring 55 so that the inner edges of the seals are congruent with the inner edge of the ring and so that the seals project axially in opposite directions from the ring.

The packing 16 also includes annular outer seals 70 of resiliently compressible and expandable material such as natural or synthetic rubber. The outer seals have a rectangular cross section and are of uniform size and shape, it being noted that their size differs from the size of the inner seals 60. Each outer seal has an annular inner edge 72 having a diameter greater than the outside diameter of the inner seal and an annular outer edge 73 having a diameter substantially the same as the outside diameter of the support ring 55. The outer seals are bonded, as indicated at 74, to the opposite radial surfaces 58 of the support ring so that the inner edges of the outer seals are substantially uniformly circumferentially spaced from the outer edges 63 of the inner seals and so that the outer edges of the outer seals are congruent with the outer edge 57 of the support ring, all as best illustrated in FIGS. 3 and 4. With the seals bonded to the ring as described, an annulus or space 76 is provided between corresponding inner and outer seals. The outer seals project axially in opposite directions from the support ring, but it will be noted that they do not project as far as the inner seals. In other words, each outer seal has an axial dimension which is less than the axial dimension of each inner seal, these axial dimensions being measured between the radial faces of the seals when the seals are in an unstressed state, as illustrated in FIGS. 3 and 4.

As an example of materials suitable for use in the packing 16, the ring 55 may be of brass and the seals 60 and 70 may be an acrylonitrile rubber. The bonding material for establishing the bonds 64 and 74 may include a first coat of Chem-lock 203 (which is a trademark of the Hughson Chemical Corporation of Erie, Pa., for their dissolved organic polymer and dispersed fillers in methyl isobutyl ketone and cellulose solvent system) and a second coat of Chem-lock 220 (a trademark of the same corporation for their dissolved organic polymer and dispersed fillers in xylene and perchlorethylene solvent system). The bonding is preferably done during molding of the seals since the resultant bond is very secure.

The size relationships between the packing chamber 42 and packing 16 are to be noted. As previously stated, the outside diameter of the ring 55, and thus of the entire packing, is less than the diameter of the packing chamber in order to facilitate assembly and disassembly. The minimum axial dimension 80 of the unstressed packing is greater than the axial spacing between the radial walls 20 and 26 of the conduits 12 and 14 when the same are interconnected by the balls 32; in this way, all of the seals are under compression when the packing is located in the packing chamber.

The use and operation of the subject packing 16 is briefly described at this point. Before the packing is assembled into the joint 10, it is smeared all over with a lubricant 85, such as grease, it being particularly noted that this lubricant fills the annuli 76 between the inner and outer seals 60 and 70. The packing is then positioned in the half of the packing chamber 42 in either the male or female conduit 14 or 12. It does not matter which end of the packing is inserted first since the packing is symmetrical about a plane equidistant between the opposite surfaces 58 of the ring. In other words, the packing is reversible.

The male and female conduits 14 and 12 are then interfitted and the balls 32 inserted in the grooves 34 and 36 and then captured therein by insertion of the plugs 38. With the conduits swively interconnected by the balls, the inner and outer seals 60 and 70 are placed under compression between the radial walls 20 and 26 of the conduit. Since the inner seals are axially longer than the outer seals, the former are under more compression than latter. This relative compression is important for providing maximum fluid-tight integrity and minimum resistance to swiveling movement of the conduits. That is, the outer seals 70 are captured in the packing chamber 42 by the support ring 55 which, it will be noted, bridges the radial gap 46 and thus precludes extrusion of the outer seals from the chamber into the gap. Accordingly, the outer seals remain in engagement with their respective radial and internal walls 20, 22, 26, and 28 irrespective of the pressure.

The inner seals 60 are not captive since they are exposed on their inner edges 62 to the fluid being conducted through the flow passage 44. The inner seals are forced outward, as shown in phantom in FIG. 5, by this fluid pressure, indicated by the arrows 90 in FIG. 5. Under this pressure, the sealing surfaces 60a slide outwardly along their respective radial walls 20 and 26 with the outer corners 60b of the inner seals eventually engaging and applying pressure against the outer seals 70. At all times, however, the bonded surfaces 60c of the inner seals remain firmly attached to the support ring 55. Because of this sliding movement of the sealing surfaces along the radial walls, it is important that the inner seals be under considerable compression in order to prevent the formation of voids or openings between the radial walls and the inner seals during the outward sliding movement. Since the outer seals are captive and are not subject to such movement, their initial compression need not be as great as that for the inner seals.

From the foregoing discussion, it will be evident that the inner seals 60 constitute the primary seals whereas the outer seals 70 establish secondary seals on their respective sides of the support ring 55. Assuming the pressure in the flow passage 44 is not sufficient to move the inner seals 60 outward, then both the primary and secondary seals preclude leakage of fluid from the flow passage into the gap 46. As the pressure increases, the inner seals move outward as described, all the while maintaining the primary seals. Eventually, the outer corners 60b of the inner seals engage the outer seals, forcing the latter into even tighter engagement with the adjacent walls 20, 22, 26 and 28; however, the primary seals are still maintained and the secondary seals are increased. If the inner seals should leak between their sealing surfaces 60a and the radial walls 20 and 26, fluid from the flow passage 44 enters the annuli 76 and bears against the outer seals forcing the outer seals into even tighter engagement with their adjacent walls; the more severe the leak is, the more fluid enters the annulus and the greater is the energization of the secondary seal.

It is thus evident that there is a unique coaction between the inner and outer seals 60 and 70 which provides a highly desirable sealing action. At the same time, these seals minimize the resistance to the swiveling of the joint. That is, since the outer seals are captive and need not be under as much compression as the inner seals, the swiveling torque in the joint 10 is reduced, especially when the joint is not carrying fluid, that is, when the seals are not subjected to fluid pressure.

Swiveling torque is also minimized by the lubricant 85. With fluid in the passage 44, outward pressure is applied on the lubricant in the annuli 76 through the inner seals 60. The lubricant is therefore exuded from the annuli onto the sealing surfaces between the seals 60 and 70 and their adjacent walls 20, 22, 26, and 28. The lubricant is forced out slowly as the pressure increases so as to maintain a film of lubricant between the packing 16 and the walls of the packing chamber 42 and to minimize frictional resistance to relative rotation between the conduits 12 and 14.

Another significant advantage of the subject packing 16 is the durability which is imparted to the packing by the rigid support ring 55. It will be remembered that the outside diameter of the packing is slightly less than the diameter of the packing chamber 42 in order to facilitate assembly and disassembly. Although the outer seals 70 are expanded into engagement with the internal walls 22 and 28, when the packing and conduits 12 and 14 are assembled, an annular clearance 95 (FIG. 5) remains between the outer edge 57 of the ring 55 and the internal walls 22 and 28. When fluid is carried in the passage 44, the packaging is subjected to pulsating, rapidly outwardly directed pressure, as illustrated by the arrows 90 in FIG. 5. This pulsating pressure tends to diametrically expand and contract the support ring. Because the ring extends the full radial dimension of the packing, it is able to withstand such pulsating force without breaking due to any fatigue which is experienced by the metal. In this regard the ring acts like a beam and imparts considerable strength to the packing.

Durability is also imparted to the packing 16 by distributing the bonding stresses between the ring 55 and the seals 60 and 70 over the entire bonding surfaces 60c of the seals, as may be understood from FIG. 5. This distribution of stress is to be contrasted with the stress concentration around only a corner of a seal when using a conventional L-shape anti-extrusion ring. With the present construction, the likelihood of separation between the seals and the ring is greatly reduced.

Still another advantage is that the inside diameters of the ring 55 and the inner seals 60 is substantially the same as the inside diameter of the flow passage 44 whereby a substantially continuous smooth flow passage is provided. No flow disturbances are caused by openings or corners between the male and female conduits 14 and 12.

From the foregoing, it will be evident that the subject packing maximizes the fluid-tight integrity of the swivel joint while minimizing resistance to swiveling thereof. Not only does the support ring preclude extrusion of the seals from the packing chamber but it imparts great durability to the packing. Also, the symmetry of the packing facilitates its assembly in the joint.

Although a preferred embodiment of the present invention is shown and described, it will be understood that various changes and modifications may be made in the details thereof without departing from the spirit and scope of the appended claims.

Having described the invention, what is claimed and desired to be secured by Letters Patent is as follows:

1. In a swivel joint including conduit means providing a flow passage therethrough surrounded by an annular packing chamber defined by a radial wall and an internal wall axially projecting from the radial wall, a packing in said chamber including an inner seal of resiliently compressible and expandable material circumscribing said passage, an outer seal of resiliently compressible and expandable material circumscribing and circumferentially spaced from said inner seal, and means maintaining said outer seal in sealing engagement with said internal and radial walls, said means also maintaining said inner seal in sealing engagement with said radial wall and permitting slidable movement outwardly therealong when subjected to fluid pressure in said passage whereby said inner seal bears against said outer seal thereby urging it against said walls and whereby if fluid escapes past said inner seal it enters the space between said seals and urges the outer seal against said walls.

2. The swivel joint of claim 1 including a flowable lubricant in the space between said seals whereby said outward movement of the inner seal forces said lubricant between said seals and said walls.

3. A packing comprising a rigid ring having opposite radial surfaces; annular inner seals of resiliently compressible and expandable material bonded to the ring on said opposite surfaces thereof; and annular outer seals of resiliently compressible and expandable material individually encircling said inner seals in circumferentially spaced relation thereto and being bonded to said opposite surfaces of the ring, said inner seals spaced from said outer seals such that when said packing is installed in sealing engagement with an annular packing chamber defined by confronting radial walls and an internal wall axially projecting from both radial walls, and subjected to radial pressure, said inner seals move outwardly and bear against said outer seals to urge them against said walls and maintain fluid-tight integrity between the seals and the walls.

4. The packing ring of claim 3 wherein the axial dimension of each inner seal is greater than the axial dimension of its outwardly adjacent outer seal.

5. The packing of claim 3 wherein said ring and inner seals are concentric and have substantially the same inside diameters.

6. The packing of claim 3 wherein said ring and outer seals are concentric and have substantially the same outside diameters.

7. The packing of claim 3 including lubricant in the annuli between said inner and outer seals.

8. A packing comprising a rigid support ring having opposite radial surfaces and annular inside and outside edges; annular inner seals of resiliently compressible and expandable material, of the uniform size and shape, and having circumferential inside and outside edges and opposite first and second radial surfaces, said first radial surfaces respectively confronting and being bonded to said opposite surfaces of the ring so that the inside edges of the seals are congruent with the inside edge of the ring and so that the outside edges of the seals are spaced inward from the outside edge of the ring; and annular outer seals of resiliently compressible and expandable material and of uniform size and shape individually encircling said inner seals and having inside edges circumferentially spaced from their respectively encircled outside edges of the inner seals, said outer seals also having first radial surfaces respectively confronting said opposite surfaces of the ring and being bonded thereto, said outer seals having circumferential outside edges congruent with the outside edge of the ring and second radial surfaces, the axial dimension of each outer seal as measured from its first radial surface to its second radial surface when the seal is unstressed being less than the corresponding axial dimension of its adjacent inner seal when the latter is unstressed, said inner seals spaced from said outer seals such that when said packing is installed in sealing engagement with an annular packing chamber defined by confronting radial walls and in internal wall axially projecting from both radial walls, and subjected to radial pressure, said inner seals move outwardly and bear against said outer seals to urge them against said walls and maintain fluid-tight integrity between the seals and the walls.

9. The packing of claim 8 wherein said ring is metal.

10. The packing of claim 8 wherein said bonded radial and opposite surfaces are united throughout substantially their entire areas.

11. In a swivel joint including swively interconnected first and second conduits having confronting radial walls extending outward from their respective axial bores and internal walls extending from the radial walls to a radial gap between the conduits, said radial and internal walls defining a packing chamber; and a packing in the chamber including a rigid ring disposed transversely of the bores and having an outside edge bridging said gap and opposite radial surfaces, inner annular seals of resiliently compressible and expandable material being secured to the opposite surfaces of the ring and compressed between the ring and said radial walls, and annular outer seals of resiliently compressible and expandable material individually circumscribing said inner seals in circumferentially spaced relation thereto and secured to the opposite surfaces of the ring, said outer seals being in engagement with said radial and internal walls, said inner seals spaced from said outer seals such that when said packing is installed in sealing engagement in said packing chamber, and subjected to radial pressure, said inner seals move outwardly and bear against said outer seals to urge them against said walls and maintain fluid-tight integrity between the seals and the walls.

12. The swivel joint of claim 11 wherein said outer seals are axially compressed between said ring and said radial walls but to a lesser extent than the inner seals are compressed.

13. The swivel joint of claim 11 wherein said ring is circumferentially spaced from said internal walls whereby it is subject to diametric expansion and contraction.

14. The swivel joint of claim 11 wherein said bores are of uniform diameter and are coaxial, and wherein said ring and inner seals are concentric with said bores and have substantially the same inside diameters as said bores.

15. The swivel joint of claim 11 wherein lubricant fills the spaces between said inner and outer seals.

16. In a swivel joint including conduit means providing a flow passage therethrough surrounded by an annular packing chamber defined by a transverse walls and an internal wall axially projecting from said transverse wall, a packing in said chamber including an inner seal circumscribing said passage, an outer seal circumscribing and circumferentially spaced from said inner seal, and means maintaining said outer seal in sealing engagement with said internal and transverse walls, said means also maintaining said inner seal in sealing engagement with said transverse wall and permitting slidable movement outwardly therealong when subjected to fluid pressure in said passage whereby said inner seal bears against said outer seal thereby urging it against said walls and whereby if fluid escapes past said inner seal it enters the space between said seals and urges the outer seal against said walls.

References Cited

UNITED STATES PATENTS

| | | | |
|---|---|---|---|
| 494,402 | 3/1893 | Walsh. | |
| 794,499 | 7/1905 | Hageman | 285—98 |
| 1,902,697 | 3/1933 | Ellingsen | 285—276 |
| 1,961,583 | 6/1934 | Hamer | 285—276 X |
| 2,384,360 | 9/1945 | Allen et al. | 285—98 |
| 2,459,981 | 1/1949 | Warren | 285—94 X |
| 2,532,891 | 12/1950 | Chupp | 277—211 X |
| 2,764,428 | 9/1956 | Murphy | 285—94 X |

FOREIGN PATENTS

| | | |
|---|---|---|
| 1,104,775 | 4/1961 | Germany. |

CARL W. TOMLIN, *Primary Examiner.*

THOMAS F. CALLAGHAN, *Examiner.*